United States Patent [19]

Webb

[11] 4,405,137
[45] Sep. 20, 1983

[54] METAL LEAF ROTARY SEAL FOR ROTARY DRUM

[76] Inventor: Samuel B. Webb, 450 Highland Ave., Naperville, Ill. 60540

[21] Appl. No.: 437,563

[22] Filed: Oct. 29, 1982

[51] Int. Cl.³ .......................... F16J 15/32; F27B 7/24
[52] U.S. Cl. .................................. 277/153; 277/148; 277/199; 432/115
[58] Field of Search ............... 277/142, 148, 152, 192, 277/153, 157, 199, 165, DIG. 4; 432/115

[56] References Cited

U.S. PATENT DOCUMENTS

| | | | |
|---|---|---|---|
| 1,550,591 | 8/1925 | Stone | 432/115 |
| 2,253,098 | 8/1941 | Schneider | 432/115 X |
| 2,522,993 | 9/1950 | Coffey | 277/142 |
| 3,383,115 | 5/1968 | Eckley et al. | 277/192 X |
| 3,917,286 | 11/1975 | Loyd | 277/153 X |
| 3,940,239 | 2/1976 | Rossi et al. | 432/115 |
| 4,111,439 | 9/1978 | Schmidt | 432/115 X |

OTHER PUBLICATIONS

Webb, "Rotary Kiln Seals," Pit & Quarry, Aug. 1975, 2 pp.
Ciments d'Obourg, Belgium, Cement Technology, Jan.-/Feb. 1974, pp. 251-253.

Primary Examiner—Robert S. Ward, Jr.
Attorney, Agent, or Firm—Fitch, Even, Tabin & Flannery

[57] ABSTRACT

A rotary seal seals a large, high temperature rotary drum to a stationary hood where the drum is mounted for rotation with respect to said hood. The seal is formed of a series of overlapping leaves of resilient metal disposed successively to encircle the drum surface, each leaf having an inner surface and an outer surface and a mounting end and a sealing end, with the mounting end affixed to the stationary hood, and the sealing end disposed at the drum surface with the outer surface concave. Each leaf extends obliquely at a substantial angle relative to an axial plane therethrough so that the sealing end is displaced circumferentially a substantial distance relative to the mounting end. Each leaf further has a sealing edge on its outer surface between the mounting and sealing ends extending obliquely of the axial plane, such sealing edge being disposed beneath the inner surface of an adjacent leaf. A wear liner is disposed on the inner surfaces of the leaves at their sealing ends for spacing the sealing ends from the drum surface and mating with the drum surface. The sealing ends are secured to the liner. The inner surface of a respective leaf is forced against the sealing edge of the respective adjacent leaf while leaving the respective sealing edge free to move relative to the respective inner surface upon flexure of the seal when the drum moves radially relative to the hood.

6 Claims, 6 Drawing Figures

METAL LEAF ROTARY SEAL FOR ROTARY DRUM

This application relates to a rotary seal for a large, high-temperature rotary drum, such as a rotary kiln, and more particularly to a flexible seal for sealing the opening between a rotating drum and a stationary hood against the inflow of ambient air.

Kilns for making cement are typically very large and very hot. Such kilns are often more than ten feet in diameter and several hundred feet long. The operating temperature is about 2750°–3000° F. Cement kilns are mounted for rotation with the infeed at one end and the discharge at the other, with both ends closed by hoods.

Partly for the sake of the environment, but mostly to avoid loss of expensive heat, it is desirable that the environment within the kiln be isolated, and to this end the spaces between the kiln and the hoods are sealed. Because of the very high temperatures and very large sizes, the more usual types of seals are not possible. For example, where the internal temperature excursions are more than 2700° F. and the length of the kiln is several hundred feet, longitudinal thermal expansion may be of the order of a foot. Some provision must be made for such longitudinal motion. Conventional flexible seals for accommodating such motion, such as rubber seals, are not possible at the high temperatures. It has been common to provide seals where rigid parts slide along the surface of the kiln to accommodate thermal expansion. Such seals have been mounted in a manner allowing for wobble in the kiln, as may be occasioned by eccentricity. However, a difficulty with such seals has been that rigid mechanical parts from time to time hang up on the kiln, whereupon the great inertia of the kiln breaks the seals to pieces.

An improved kiln seal is disclosed in Webb, "Rotary Kiln Seals", Pit & Quarry, August 1975. Such kiln seal was formed by a plurality of flaps of woven asbestos coated with a low friction material, such as a fluorocarbon resin sold by DuPont under the trademark Teflon. While such seals offered many advantages, the multiplicity of separate flaps provided substantial permeability to the seal, resulting in substantial leakage of air, with the consequent leakage of heat, and thus a waste of costly fuel. Further, the separate flaps permitted some of the hot product to fall out of the end of the kiln through the seal. Still further, the life of the seal was relatively short, and the melting point of the fluorocarbon coating limited the use of the seal. Also, the individual flaps were sometimes sucked into the sealed volume by pressure differential, causing the seal to become ineffective.

Another rotary kiln seal is disclosed in Schmidt U.S. Pat. No. 4,111,439, issued Sept. 5, 1978 for "Rotary Seal." In the seal there disclosed, a strip of flexible material was used to seal the space between a large high-temperature rotary drum and an adjacent hood, where the drum had a substantially circularly cylindrical surface substantially coaxial with the axis of rotation of the drum, and the hood had a substantially circular opening adjacent that cylindrical surface, the opening being substantially perpendicular to the axis of rotation and the center of the opening lying substantially on the axis. The strip had a mounting end and a sealing end and was made of discrete pieces of woven asbestos cloth sewn together so as to be substantially air impermeable and resistant to heat and oxidation, at least up to 250° F., and preferably up to 800° F. The mounting end was sealed around the hood opening. A wear liner was affixed to the underside of the sealing end of the strip for spacing the strip from the cylindrical surface of the kiln. The wear liner was made of automobile brake lining material so as to be resistant to heat and oxidation at temperatures resulting from the frictional engagement of the wear liner and the surface. A spring biased cable was strung through eyes affixed to the wear liner so as to urge the liner against the cylindrical surface. Such rotary seals have proven particularly effective, but the use of asbestos has given concern because of its carcinogenic properties. The release of asbestos fibers to the atmosphere must be restricted.

Another rotary seal is shown in Cement Technology, January/February 1974 at page 252. Such seal developed by Fives-Cail Babcock is much like that shown in Pit & Quarry but utilizes discrete spring steel leaves instead of woven asbestos flaps. As with the earlier seal, a problem with the metal leaf seals has been leakage of air and product between the leaves or between the leaves and the kiln shell. Also the free distal ends of the metal leaves scored the kiln shell.

The present invention is an improvement over the Schmidt seal in using discrete metal leaves instead of a strip of woven asbestos. It is an improvement over the Fives-Cail Bobcock seal in that it includes a wear liner as in the Schmidt seal to prevent scoring of the kiln shell and overcomes the problem of leakage between the leaves by the particular manner in which the leaves are shaped and related. More particularly, in accordance with the present invention, discrete metal leaves are formed from resilient sheet metal, preferably from strips of spring steel, capable of withstanding the high temperatures to which the seal is exposed. The leaves are preferably generally rhombic and relatively disposed with two opposite edges extending diagonally of the direction of the wear liner. The other edges are secured to the hood and the wear liner, respectively. The diagonal edges of adjacent leaves overlap in sliding relation. The leaves are bent and stressed so that the underside of the upper leaf and the underlying edge portion of the lower leaf are urged together to close the junction of the adjacent leaves to seal against air leakage between the leaves.

Therefore, a primary aspect of the present invention is the provision of a rotary seal for large, high-temperature rotary drums, such as rotary kilns, and more particularly to provide such seal as will more effectively prevent air leakage and is long-lived, using materials that are ecologically benign.

Other aspects and advantages of the present invention will become apparent from consideration of the following detailed description, particularly when taken in conjunction with the accompanying drawings in which.

Figure 1:
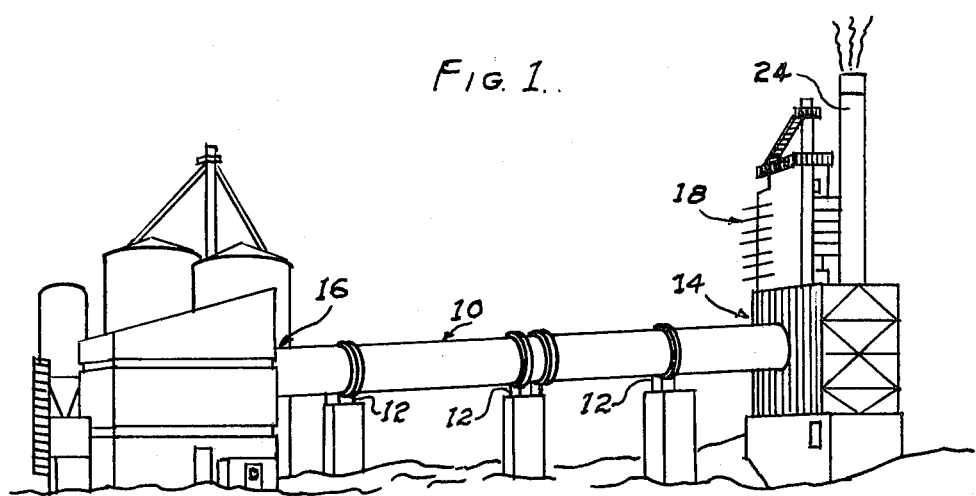
FIG. 1 is a generalized and somewhat stylized drawing of a cement plant including a rotary cement kiln in which the present invention finds particular utility.
Figure 2:
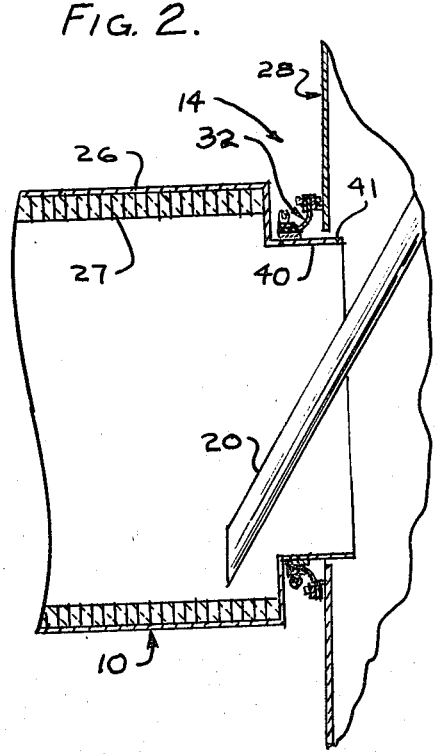
FIG. 2 is a vertical sectional view of a typical feed end of a rotary cement kiln as illustrated in FIG. 1, showing a rotary seal in accordance with the present invention.

The rotary seal of the present invention was designed for sealing very large rotary drums experiencing very large heat excursions and in particular was designed for use with rotary cement kilns such as that illustrated generally in FIG. 1. Portland cement is made by heating certain minerals, primarily limestone, in a rotary kiln. As shown in FIG. 1, a drum in the form of a rotary kiln 10 is rotatably mounted on driving supports 12. The kiln 10 is mounted with an axis of rotation at an angle to the horizontal and extends from an elevated feed end 14 to a lower discharge end 16. At the feed end 14, the raw materials are fed from hoppers 18 through a chute 20 (FIG. 2). As the kiln 10 is rotated, the materials fall by gravity along the kiln toward the discharge end 16. At the discharge end 16, fuel is introduced through a burner 22 (FIG. 3) which is located at the axis of rotation of the kiln 10. The fuel is burned to create high temperatures in the kiln 10, typically 2750°–3000° F. The raw minerals are thereby burned to produce the cement clinker, which falls from the kiln 10 at the discharge end 16 by gravity and is discharged into a heat recuperator through which air is drawn into the kiln 10 for combustion. The passage of air through the heated product recovers heat from the product to produce higher temperature within the kiln 10, hence saving fuel. The kiln is thus a countercurrent furnace with the solids moving from top to bottom and the exhaust gases moving from bottom to top, where they go up a stack 24.

The outside of the kiln 10 is formed of a kiln shell 26 made of steel. To protect the kiln shell 26 from the high temperatures of the manufacturing process, the shell is lined with a refractory lining 27. The kiln shell 26, therefore, normally does not rise above about 500° F. at the discharge end 16. Of course, it is cooler at the feed end 14.

Partly for environmental reasons, but more importantly for efficiency and economy, the feed end 14 and the discharge end 16 of the kiln 10 are surrounded by hoods 28 and 30, respectively. To improve the effectiveness of the hoods, the openings between the kiln ends 14, 16 and the respective hoods 28, 30 are sealed with rotary seals 32 of the present invention. The hood 28 at the feed end 14 is often called a dust chamber, as it is part of the dust collecting system whereby dust particles from the processing are removed from the combustion gases before discharging the gases into the atmosphere through the stack 24. The hood 30 at the discharge end 16 is often called a firing hood, as the burner is located therein.

Figure 4:
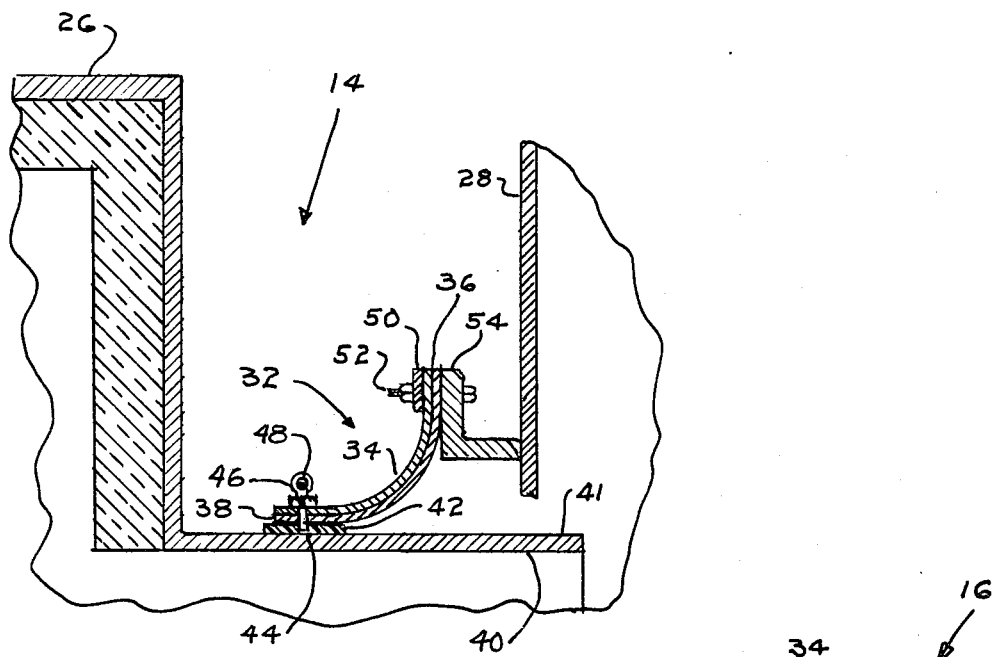
FIG. 4 is an enlarged sectional view taken in an axial plane of the seal portion of the structure shown in FIG. 2.
Figure 6:
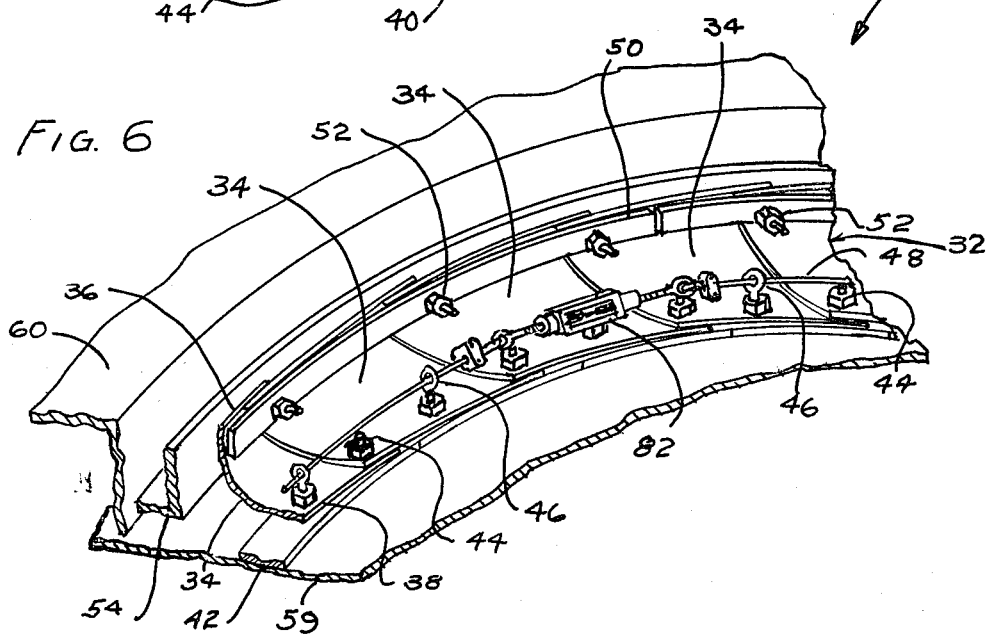
FIG. 6 is an isometric view of part of the discharge end of a rotary kiln as shown in FIG. 3, with the seal of the present invention mounted in place.
Figure 5:
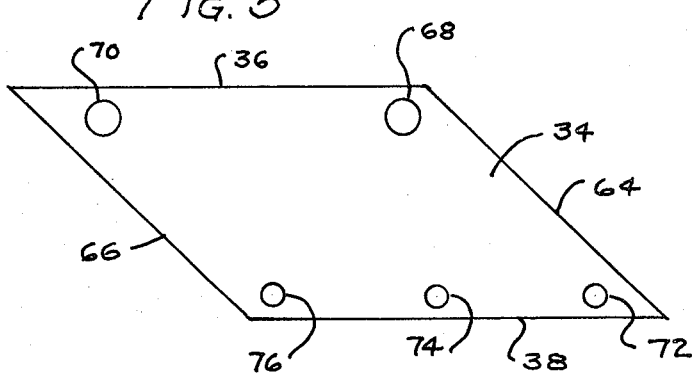
FIG. 5 is a plan view of a typical leaf of sheet metal utilized in forming the seal illustrated in FIG. 4.

As shown in greater detail in FIGS. 4, 5 and 6, the seal 32 is in the form of a series of discrete leaves 34 having mounting ends 36 and sealing ends 38. The leaves 34 encircle the kiln 10. As shown in FIG. 4, which illustrates the feed end 14, the kiln 10 sometimes terminates in a kiln neck 40 which is a circularly cylindrical member having an outer substantially circularly cylindrical surface 41 substantially concentric with the axis of rotation of the kiln 10. A wear liner 42 is disposed between the sealing ends 38 of the leaves 34 and the kiln neck 40 to provide a wear surface and to protect the kiln surface 41 from scarring by the leaves 34. The wear liner 42 is fastened to the undersurface of the sealing ends 38 by conventional means, such as by bolting with bolts 44. Some of the bolts provide eyes 46 through which a cable 48 is strung for holding the sealing ends 38 of the leaves 34 and the wear liner 42 against the cylindrical surface 41 to preclude leakage of air. The mounting ends 36 of the leaves 34 are clamped by a segmented clamping ring 50 to a vertical member 54 of the hood 28. The clamping ring 50 may be secured by bolts 52. The vertical member 54 provides a circular opening with its center at the axis of rotation of the kiln 10, thus providing a circular flange onto which the seal leaves 34 are mounted to surround the cylindrical surface 41 of the kiln neck 40.

Figure 3:
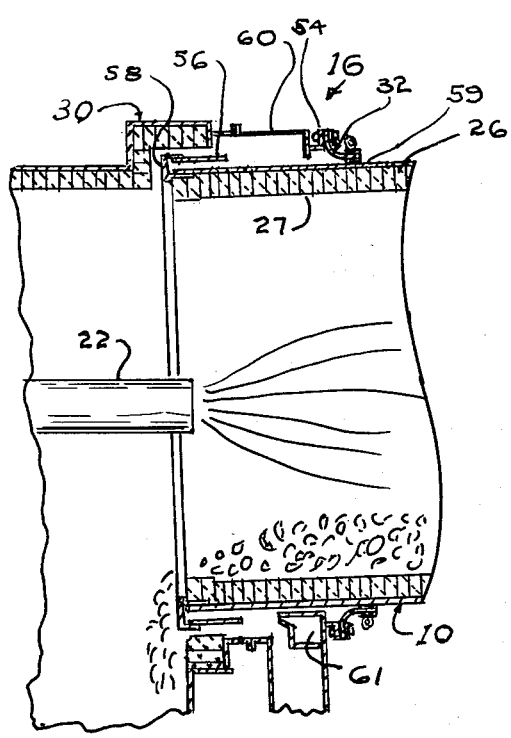
FIG. 3 is a vertical sectional view of a typical discharge end of a rotary cement kiln as illustrated in FIG. 1, also showing a rotary seal in accordance with the present invention.

A similar seal 32 is utilized at the discharge end 16 of the rotary kiln 10. However, because the discharge end is substantially hotter than the feed end 14, an air cooled cowl 56 may be positioned around the kiln shell 26 at the discharge end 16 as shown in FIG. 3. The cowl 56 is fastened to a nose ring 58 which acts to hold the bricks of the refractory lining 27 in place and is made of heat resistive alloys suitable for very high temperatures. The cowl is supported a few inches from the kiln shell 26 and provides space for the circulation of air around the cowl 56 as by gravity or by using a blower, so that the cowl 56 and the nose ring 58 are kept relatively cool by the circulating air. The cowl 56 may be kept to a temperature of between about 200° to 400° F. In this sealing arrangement, a circularly cylindrical surface 59 is provided by the kiln shell 26, the surface 59 being substantially coaxial with the axis of rotation of the kiln 10. In the embodiment illustrated in FIG. 3, a hood extension 60 extends over the cowl 56. Cooling air is introduced through a duct 61, circulated around the cowl 56 and the hood extension 60, and the resulting heated air passes into the kiln. The air is heated in cooling the cowl 56 and other structure within the hood extension 60, and the thus heated air is then used as part of the air for combustion. In this embodiment, the hood extension 60 shields the seal 32 from direct radiation from the inside walls of the hood 30. This protects the seal material from such a hostile environment, extending seal life. In an alternate arrangement, the seal may simply bridge the space between hood 30 and the air cowl 56. The latter arrangement is used where the temperature inside the hood 30 is not excessive.

As best illustrated in FIGS. 4, 5 and 6, the rotary seal 32 of the present invention is formed of a series of leaves 34 completely encircling each respective kiln surface 41 or 59 with no spaces between individual leaves. Further, the spring of the leaves 34 and the curvature of the seal 32 allow for the seal to remain seated against the respective surface 41 or 59 even with substantial wobble or eccentricity or out-of-roundness in the rotating kiln 10. Although substantially circular, the kiln 10 normally flexes into an oval as it rolls and often develops eccentricities.

In a preferred embodiment, each leaf 34 is formed of an approximately rhombic piece of flat spring steel stock, as shown in FIG. 5. Strip stock 0.80 mm thick and 300 cm wide sold as 11R51 Sandvik steel by Sandvik Svenska Forsaljnings AB, Vastberga, Stockholm, Sweden has proven effective for forming the leaves 34. Such metal has excellent finish, corrosion resistance, sealing resistance at elevated temperatures, high hardness and high fatigue strength. Sandvik 11R51 steel when fully hardened has a hardness about 60 to 63 Rockwell C and tensile strength about 275,000 psi. Each leaf has a mounting end 36 and a sealing end 38. It has two side edges 64 and 66, the former forming an acute angle of about 45° with the edge of the sealing end 38, and the latter forming an obtuse angle of about 135° with the edge of the sealing end 38. To make the seal 32, the cut pieces are preformed by permanently bending the individual leaves approximately 80°, to almost the final determation shown in FIG. 6, providing a concave outer surface to each leaf taken in an axial plane through the respective leaf (FIG. 4).

The leaves 34 are relatively disposed in overlapping fashion like scale armor to encircle the respective cylindrical surface 41 or 59, with each edge 64 lying beneath the edge 66 of the adjacent leaf 34. Each respective edge 66 extends out of the cylindrical sector formed by axial planes bounding the respective mounting end 36. That is, the pointed corner of each leaf 34 extends circumferentially of the respective cylindrical surface 41 or 59. The bolts 52 pass through bolt holes 68 and 70 in the mounting ends 36 of respective leaves 34 to mount the leaves to the respective stationary hood 28 or 30, the hole 68 of one leaf 34 lying below the hole 70 of the adjacent leaf 34. Similarly, the bolts 44 pass through bolt holes 72, 74 and 76 in the sealing ends 38 of respective leaves 34 to fasten the leaves 34 to the wear liner 42, the hole 72 of one leaf 34 lying below the hole 76 of the adjacent leaf 34. As the bolt holes 72, 76 of each leaf 34 lies on a lesser radius than the bolt holes 68, 70, the latter are farther apart than the former.

The seal 32 is made to fit each particular shell or drum 26. The number of leaves 34 is selected so that each leaf spans but a relatively small angle around the drum, no more than about 15°. For example, it has been found suitable to provide 63 leaves for a 15 foot drum, each spanning somewhat less than 6°. Actually, each leaf 34 was made about 11 inches long with a two inch overlap of adjacent leaves. This provides an angle between successive leaves 34 that permits an effective seal. The use of too few leaves provides such a difference in alignment of successive leaves as to make sealing therebetween difficult, if not impossible, and the use of too many leaves provides that many more points of potential in-leakage.

The wear liner 42 is preferably formed in abutting sections, with one section per leaf and secured through the bolt holes 72 and 74 of each respective leaf. It has proven effective to make such wear liner sections from 9"×3"×¼" sintered, heat resistant brake frictions made by Friction Products Company, Medina, Ohio, wherein the grit normally incorporated in the brake frictions has been replaced by graphite granules for lubrication. The brake frictions are bent to conform generally to the respective kiln cylindrical surface 41 or 59.

In assembling the seal 32, the leaves 34 are placed loosely in overlapping succession on the bolts 44 and 52, the bolts 52 passing through the vertical member 54 and the bolts 44 passing through sections of the wear liner 42. The last leaf is tucked under the first. Nuts are then gradually tightened on the respective bolts. Tightening of the nuts on the bolts 52 seals the mounting ends 36 to the hood 28 or 30 and urges the sealing ends 38 against the cylindrical surface 41 or 59. The center of the bolt circle of the bolts 52 lies substantially on the axis of rotation of the cylindrical surface 41 or 59 and is spaced therefrom by a distance that requires further bending of the leaves 34 when the mounting ends 36 are forced flat against the vertical member 54. The spring tension thereby created in the leaves then forces the sealing ends 38 against the cylindrical surface 41 or 59 with the wear liner 42 therebetween, thereby sealing the wear liner against the cylindrical surface. Spring tension in an overlying leaf 34 urges the pointed corner of the respective adjacent underlying leaf inward. Tightening of the nuts on the bolts 44 urges the sealing ends 38 to conform to the wear liner 42 and form a seal therebetween.

The spacing of the bolt holes 68 and 72 and the bolt holes 70 and 76 assures that when all bolts are tightened, the sealing ends 38 conform to the cylindrical surface 41 or 59, and there are forces urging the inner surface of each leaf 34 and the underlying sealing edge 64 of the adjacent leaf 34 together. This leaves the respective sealing edge 64 free to move relative to the adjacent inner surface upon flexure of the seal 32 and assures the integrity of the seal 34 even though the cylindrical surfaces 41 and 59 get out of round and rotate with a wobble.

As a further means of assuring sealing upon flexure of the seal 32 under conditions of radial movement of the cylindrical surface 41 or 59 relative to the hood 28, 30, the cable 48 is provided in the illustrated preferred embodiment of the seal 34. The cable 48 is disposed through the eyes 46 and tightened by a turnbuckle 82 after the bolts 44 and 52 have been tightened.

Although a specific preferred embodiment of the seal 34 of the present invention has been shown and described, various modifications may be made in the seal without departing from the scope of the present invention. For example, other materials having the described properties may be used. Other specific shapes and sizes of the leaves 34 may be used. The mounting ends 36 and the sealing ends 38 of the leaves 34 may be any shape that seals against the hood 28, 30 and cylindrical surface 41, 59, respectively. The side edge 66 may also be almost any shape that provides an under surface that seals against the sealing edge 64 of the underlying leaf 34. The latter, too, may take a number of shapes, so long as it permits the overlying inner surface of the adjacent leaf 34 to be forced against it so that the respective sealing edge and inner surface may move relative to one another upon flexure of the seal 32.

It is important, however, that the leaves 34 be concave in respect to axial planes therethrough and extend obliquely from their mounting ends 36 to respective sealing ends 38 so that each leaf has its sealing end displaced circumferentially a substantial distance relative to its mounting end and provides a sealing edge 34 between the mounting and sealing ends that extends obliquely of an axial plane. Preferably each sealing end is displaced in the direction of rotation of the kiln shell 26 so as to provide less buckling force on the leaves 34 in the event of substantial friction between the wear liner 42 and the respective surface 41 or 59.

It may also be noted that the edge seal need not be exclusively along the sealing 64 but may extend to surface to surface sealing near the bolt holes, where the inner surface of an overlying leaf is held flat against the outer surface of an underlying leaf.

The rotary seal 32 of the present invention also may be used in other industries. Other places where the seal finds utility include lime kilns for calcining limestone, regenerators of sludge in the paper industry, kilns for making refractory materials or lightweight aggregates, scrubbers for removing sulfur dioxide and particulate matter from boiler gases, and dryers of aggregate for bituminous concrete.

As stated above, the rotary seal 32 of the present invention is designed to limit the inflow of ambient air into the drum 10. In cement plants, a discharge fan produces a pressure within the kiln 10 of 0.06 to 10 in. $H_2O$ below atmospheric pressure. The fan draws combustion gases through the kiln 10 and pushes them through a dust collector. The dust collector is often a multi-million dollar system that removes the dust from the air so that the air leaving the stack 24 meets environmental standards. Any air leaking into the cement processing gases, other than that provided for the processing itself, merely dilutes the combustion products and makes removal of the contaminants more difficult. The use of the seals of the present invention thus facilitates the cleaning of the combustion gases by the dust collector, and makes it easier for dust collectors to meet the current environmental standards by law. This is particularly helpful where the dust collector already installed was designed for earlier, less stringent, environmental standards.

At the hot end of the kiln, reduction of leakage of ambient air into the kiln is a direct savings in thermal energy required for the process. The making of cement requires a certain threshold temperature. Where cool air is permitted to leak in, the temperature in the kiln is reduced. This requires the burning of additional fuel to keep the kiln temperature at the desired point.

What is claimed is:

1. A rotary seal for sealing a large, high temperature rotary drum to a stationary hood where said drum is mounted for rotation with respect to said hood about an axis of rotation defining axial planes, said drum having a substantially circularly cylindrical surface near one open end thereof substantially coaxial with said axis of rotation, and said hood being open to the interior of said drum through said open end, said seal comprising:
   a series of overlapping leaves of resilient metal disposed successively to encircle said cylindrical surface, each said leaf having an inner surface and an outer surface and a mounting end and a sealing end, with said mounting end affixed to said stationary hood, and said sealing end disposed at said cylindrical surface with said outer surface concave in a said axial plane, each said leaf extending from said mounting end to said sealing end obliquely relative to a said axial plane therethrough so that said sealing end is displaced circumferentially a substantial distance relative to said mounting end, and each said leaf further having a sealing edge on said outer surface between said mounting and sealing ends extending obliquely of a said axial plane, said sealing edge being disposed beneath the inner surface of an adjacent leaf,
   a wear liner disposed on the inner surfaces of said leaves at their sealing ends for spacing said sealing ends from said cylindrical surface and having an inner surface on a side opposite said sealing ends for mating with said cylindrical surface, and
   means for securing said sealing ends to said wear liner and forcing said inner surface of a respective leaf against said sealing edge of the respective adjacent leaf while leaving said respective sealing edge free to move relative to said respective inner surface upon flexure of said seal when said drum moves radially relative to said hood.

2. A rotary seal in accordance with claim 1 wherein said sealing edge extends away from the cylindrical sector defined by said mounting end and respective said axial planes.

3. A rotary seal in accordance with claim 2 wherein said sealing ends of the respective said leaves are displaced from respective said mounting ends in the direction of motion of said drum.

4. A rotary seal in accordance with any one of claims 1 to 3 wherein the resiliency of said leaves biases said wear liner against said cylindrical surfaces and biases respective said sealing edges and inner surfaces together.

5. A rotary seal in accordance with claim 4 further including a cable over said sealing ends of all said leaves for holding said wear liner against said cylindrical surface.

6. A rotary seal in accordance with any one of claims 1 to 3 further including a cable over said sealing ends of all said leaves for holding said wear liner against said cylindrical surface.

* * * * *